UNITED STATES PATENT OFFICE.

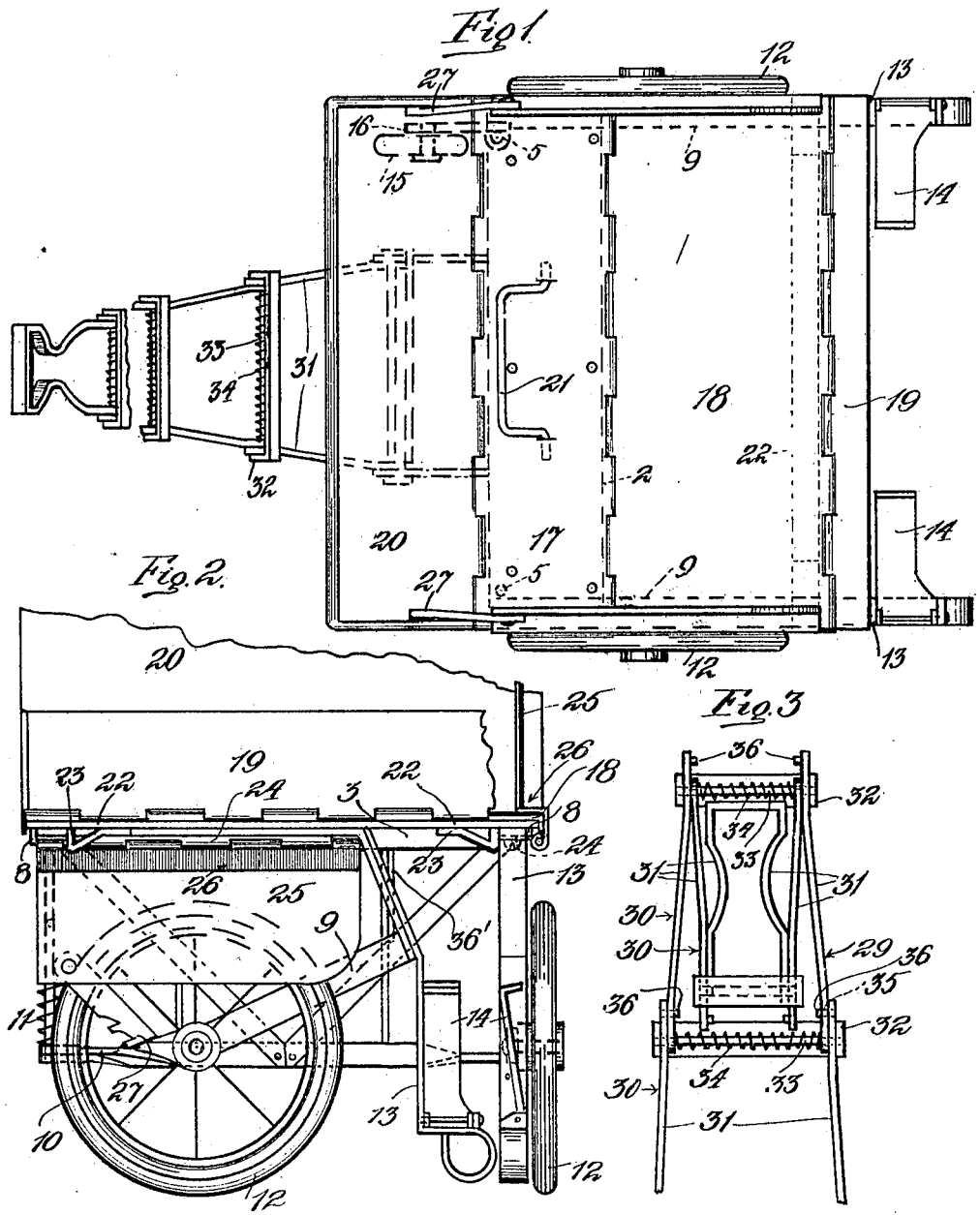

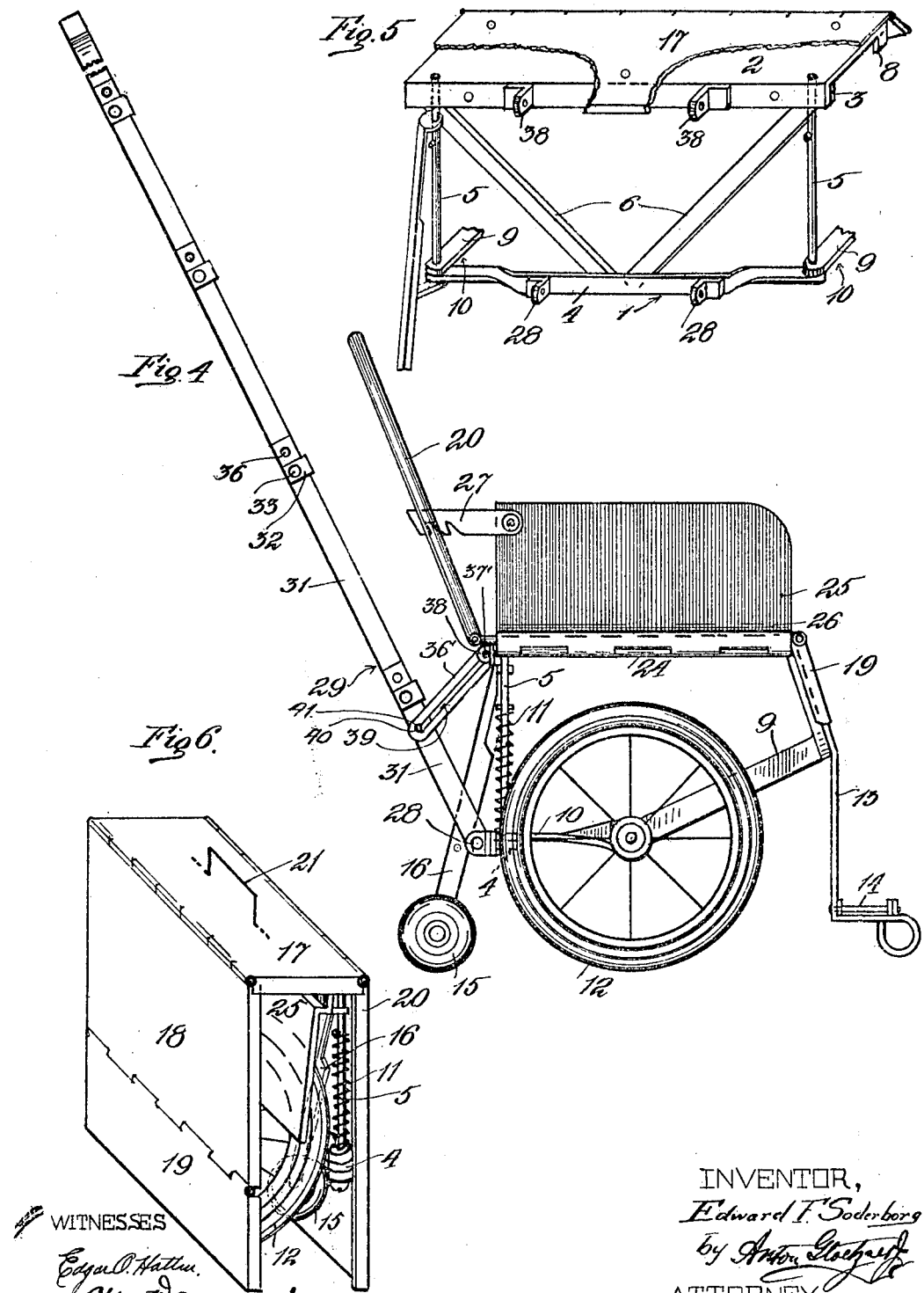

EDWARD F. SODERBORG, OF LONG BEACH, CALIFORNIA, ASSIGNOR OF FORTY-NINE ONE-HUNDREDTHS TO EDGAR O. HATTEN, OF LONG BEACH, CALIFORNIA.

GO-CART.

1,280,888.  Specification of Letters Patent.  Patented Oct. 8, 1918.

Application filed April 4, 1918. Serial No. 226,769.

*To all whom it may concern:*

Be it known that I, EDWARD F. SODERBORG, a citizen of the United States, residing at Long Beach, county of Los Angeles, and State of California, have invented a certain new and useful Improvement in Go-Carts, of which the following is a specification.

My invention relates to a perambulator or go-cart and has for its object to provide a simple, cheap, light and strong cart in which the parts may be folded into the smallest possible space and into a compact article conveniently carried about, and in which the unfolding of the same may be accomplished with ease and speed.

Other objects will appear from the subjoined specification in connection with the accompanying drawings, which illustrate a preferred form of embodiment of the invention.

In the drawings,

Figure 1 is a plan view of the cart unfolded and ready for use.

Fig. 2 is a front view showing one of the wheels in folded position and the other in unfolded position.

Fig. 3 is a plan view of the sectional foldable handle in folded position.

Fig. 4 is a side view of the cart in unfolded position ready for use.

Fig. 5 is a fragmentary view of the main frame, and

Fig. 6 is a perspective view of the cart folded for transportation.

Referring to the drawings, and particularly to Fig. 5, the invention comprises a main frame 1, consisting of a plate 2, riveted or otherwise secured to a horizontal bar 3, and a horizontal bar 4, the plate 2 and bar 4 being tied together at their ends by vertical posts 5, braces 6 serving additionally to strengthen the frame. Each side of the plate 2 is formed with a lug 8, Fig. 2, for purposes to appear hereinafter.

On each post 5 is pivoted a side member 9, consisting of a strip of metal bent upon itself substantially at right angles, and the free ends thereof are provided with holes through which the posts extend, the lower branch 10 of each side member lying on and above the horizontal bar 4 and being capable of movement relatively to the posts, springs 11 coiled about the posts serving to hold the lower branches of the side members in position and to take up and absorb jars and shocks.

On each of these side members is journaled a wheel 12, which with the side members are foldable to a position in the same parallel plane as the bar 4.

On the front of each side member is fixed a downwardly extending support 13 for the front of the perambulator, such support having pivoted thereon a foot rest 14. The tilting of the cart rearwardly is prevented by a wheel 15, journaled on the end of a prop 16, which is attached to and movable about one of the posts 5.

To the top of the plate 2, is riveted a leaf 17, which in conjunction with a sheet 18, hingedly connected to the front of the leaf, forms the seat of the cart.

A metal apron 19 is hingedly secured to the front of the sheet 18 and provides a rest for the legs of the child, and a back 20, is hingedly attached to the rear of the leaf. When folded, the back 20, and the sheet 18 with its apron 19, forms the cover of the perambulator, while the top is formed by the leaf 17, all as shown in Fig. 6. A suitable handle 21, may be provided in the leaf 17, for convenient carriage.

On the underside of the sheet 18, is riveted a strip 22, of metal, provided with an abutment 23 at each end, which serves to prevent the inward movement of the wheel carrying side members 9, the outward movement of said members being prevented by the aforedescribed lugs 8, on the plate 2.

On the underside of the upper branch of each side member is secured a leaf 24 to which is hingedly attached a side 25, formed with an offset 26, which, when said side is in position for use, forms a lock for the sheet 18 or seat and prevents same from being lifted. It will be apparent that the side members 9 support the seat when the perambulator is in unfolded position for use.

The back 20 is held in position of adjustment by any convenient means, as a rack 27, pivotally connected to the sides 25 and arranged to pass through an opening in the back.

The bar 4 is provided with a plurality of ears 28, for pivoting a foldable handle 29, consisting of a plurality of joined sections, 30, severally comprising spaced members 31, conjoined at their ends by a substantially U-shaped piece of metal 32 and a pin 33, over which is coiled a tension spring 34, for holding spaced the ends of the members of another associated section, which ends are pivotally mounted on said pin 33, and are provided with holes 35, for engagement by studs 36 of other sections, whereby to prevent relative movement of the sections in one direction, while the U-shaped piece of metal prevents relative movement in another direction. Obviously by pressing toward each other the ends of the members, they may be engaged or disengaged from the studs and their movement about their pivots accomplished.

The handle is held in permanent position after being unfolded, by a link 36', pivotally carried on a shaft 37', journaled in ears 38 on the plate 2, such link having an elongated slot 39, in which is arranged to travel a pin 40, during the folding or unfolding of the handle, such pin, when the handle is unfolded eventually engaging in a notch 41 in said link and holding the same in position.

What I claim, is:—

1. A go-cart comprising a frame, side members pivoted on said frame, wheels journaled on said side members, a seat and a back hinged to said frame, means on said frame to prevent outward movement of said side members, means on said seat to prevent inward movement of said side members, and sides on said side members.

2. A go-cart comprising a frame, side members pivoted on said frame, wheels journaled on said side members, a seat and a back hinged to said frame, and sides hinged to said side members and forming a lock for said seat.

3. A go-cart comprising a frame, side members pivoted on said frame, wheels journaled on said side members, a seat and a back hinged to said frame, said seat supported by said side members, sides hinged on said side members and forming a lock for said seat when in position for use, and locking means for said side members.

4. A go-cart comprising a frame, side members pivoted on said frame and capable of being folded relatively to said frame, wheels journaled on said side members, a seat and a back hingedly connected to said frame, sides hingedly connected to said side members and formed with offsets whereby to lock the seat against upward movement, means to lock the side members in adjusted position, and a foldable handle pivotally connected to the rear of the frame.

5. A go-cart comprising a frame, side members pivoted on said frame, wheels journaled on said side members, a seat and a back hinged to said frame, pivotal means to prevent rearward tilting of the cart, sides hinged to said side members and forming a lock for said seat, means for holding the back in position, and a foldable handle pivotally attached to the rear of the frame.

6. A go-cart comprising a frame, consisting of a plate and a horizontal bar, posts connecting the end of the plate and bar, side members pivotally attached to said posts, shock-absorbing springs on said posts, wheels journaled on said side-members, a seat and a back hinged to said frame, sides hinged to said side members and formed with offsets to lock the seat against upward movement, means to lock the side members against movement, means to hold the back in position of adjustment, and a foldable handle on the rear of the frame.

In testimony whereof I have set my hand in the presence of two witnesses.

EDWARD F. SODERBORG.

Witnesses:
EDGAR O. HATTEN,
ANTON GLOETZNER, Jr.